(12) United States Patent
Yun

(10) Patent No.: US 6,473,947 B2
(45) Date of Patent: Nov. 5, 2002

(54) SAFETY BELT RESTRAINING DEVICE

(76) Inventor: Sang S. Yun, 525 S. Berendo St., #313, Los Angeles, CA (US) 90020

( * ) Notice: Subject to any disclaimer, the term of this patent is extended or adjusted under 35 U.S.C. 154(b) by 0 days.

(21) Appl. No.: 09/808,888

(22) Filed: Mar. 16, 2001

(65) Prior Publication Data

US 2002/0130505 A1 Sep. 19, 2002

(51) Int. Cl.⁷ .............................................. A44B 11/26
(52) U.S. Cl. .................. 24/579.11; 24/602; 24/DIG. 31
(58) Field of Search ................................. 297/471, 468, 297/483; 280/801.1, 808; 24/DIG. 31, DIG. 35, 602, 603, 633, 579.09, 579.11

(56) References Cited

U.S. PATENT DOCUMENTS

| | | | |
|---|---|---|---|
| 2,880,815 A | 4/1959 | Apfelbaum | 180/82 |
| 3,235,930 A | * 2/1966 | Chapin et al. | 24/602 |
| 3,438,674 A | 4/1969 | Radke et al. | 297/386 |
| 3,482,872 A | 12/1969 | Chamberlain | 297/386 |
| 3,838,746 A | 10/1974 | Andres | 180/82 |
| 4,201,418 A | 5/1980 | Reidelbach et al. | 297/474 |
| 4,606,441 A | 8/1986 | Markov | 188/371 |
| 5,121,527 A | * 6/1992 | Righi | 24/602 |
| 5,149,189 A | * 9/1992 | Kawamura | |
| 5,381,590 A | * 1/1995 | Liou et al. | 24/602 |
| 5,596,312 A | * 1/1997 | Fowler et al. | 200/61.58 B |
| 5,627,512 A | * 5/1997 | Bogar | 340/457 |
| 5,892,436 A | * 4/1999 | Blackburn et al. | 180/268 |
| 6,102,439 A | 8/2000 | Smithson et al. | 280/805 |
| 6,325,412 B1 | * 12/2001 | Pan | 180/268 |

* cited by examiner

Primary Examiner—James R. Brittain
(74) Attorney, Agent, or Firm—John K. Park; Park & Sutton LLP

(57) ABSTRACT

A safety belt restraining device designed to be attached to an existing vehicle safety belt system having a male clip and a female buckle. The safety belt restraining device includes a body with a female member integrated within the body. The female member has a hooking member. Opposing the female member is the male member, which has a male end, a male base and a travel member. The travel member receives the hooking member and the travel member limits the movement of the female member. At least two elastic members are attached between the female member and the male member.

7 Claims, 3 Drawing Sheets

SAFETY BELT RESTRAINING DEVICE

BACKGROUND

The invention relates to safety belt restraining devices. Many vehicles have safety belts, including lap belts and combination shoulder-lap belts. Commonly, the vehicles come pre-equipped with safety belts. The basic safety belt can operate suddenly under vehicle impact or abrupt braking, with little elasticity to cushion the suddenness of the restraint. Children are especially vulnerable to the severe injuries that can result from the rapid operation of traditional safety belt systems. Currently children 4 years of age and weighing 40 pounds can ride in a vehicle using a safety belt, rather than a child's car seat. New regulations in California will raise the limit to 6 years and 60 pounds. This regulatory change highlights the concerns surrounding the rapid operation of traditional safety belt systems.

There are prior art devices available that can be added to the safety belt to provide added cushioning of the impact. These prior art devices are designed to be a permanent part of the safety belt system and come pre-installed on the vehicle.

There is a need for a safety belt restraining device that can be easily added to and removed from the existing safety belt system by the vehicle owner. The device needs to be compact and lightweight. Easy installation and attachment to the existing safety belt system is required.

SUMMARY

The safety belt restraining device fulfills the objectives of providing a cushioning device that is compact, lightweight and can be easily adapted to the existing safety belt system. The invention is applicable to any vehicle that has a safety belt including automobiles, boats, trains, trucks and planes. A safety belt restraining device is designed to be attached to an existing vehicle safety belt system having a male clip and a female buckle. The safety belt restraining device includes a body with a female member integrated within the body. The female member has a female end, a female base and a hooking member. Opposing the female member is a male member integrated within the body. The male member has a male end, a male base and a travel member. The travel member receives the hooking member and the ravel member limits the movement of the female member.

At least two elastic members are attached between the female member and the male member. Each elastic member has a first end and a second end. The first end is attached to the female base and the second end is attached to the male base. The female end can receive the male clip of the safety belt and the male end can be inserted into the female buckle of a safety belt. The elastic member provides restrained and cushioned movement of the female member during the restraining operation of the existing safety belt. The elastic member provides elastic cushioned restraint as the hooking member moves within the channels of the travel member. When the hooking member reaches the limits of movement within the travel member then movement of the female member is halted. The increasing degrees of elasticity act as a shock absorber to the forward movement of the passenger's body.

The female end of the invention accepts and attaches to the male clip of an existing safety belt. The male end attaches to the female buckle of the safety belt. When the existing seat belt and the invention are not in use by the passenger, the safety belt restraining device can be left attached to either the male clip or the female buckle of the existing safety belt.

The elastic member can be a damper. The damper is filled with a fluid that restrains the movement of a plunger within the damper. The damper can be designed where, progressively more force is absorbed by the damper as expansion occurs. Other methods and ways of providing an elastic restraining action are well known in the art.

Alternately, the elastic member can be a spring. The length of the spring, thickness of the wire, number of coils and diameter of the coils can all be varied to provide differing degrees of elasticity to the spring. As the coils extend, progressively more force is required to continue the expansion of the spring. Increasing resistance in the spring to further expansion creates a cushioning effect. The force of passenger upon the seat belt and safety belt restraining device is absorbed in the expansion of the spring.

The springs or dampers are located on the outside of the hooking member and travel member, so that the elastic member does not interfere with the movement of the hooking member and travel member. The elastic member is attached to the male member near the male base and attached to the female member near the female base. A light can be included on either the female end or the male end.

The travel member can include a first slotted channel and a second slotted channel. The hooking member includes a first wing and a second wing. The first slotted channel receives the wing and the second slotted channel receives the second wing of the hooking member. The first slotted channel limits the movement of the first wing and the second slotted channel limits the movement of the second wing.

The first wing slides back and forth within the first slotted channel. When the safety belt restraining device is in a non-operating state the first wing is positioned within the first slotted channel closer to the male end. The elastic member is in a non-operating, resting state. When the vehicle experiences an impact the safety belt restraining device operates. The first wing of the hooking member begins to slide within the first slotted channel of the travel member, from near the male end towards the female end. The elastic member begins to extend, limiting and cushioning the movement of the female member. The increasing restraint provided by the elastic member, cushions and delays the jolting impact that occurs to the passenger, when the elastic member reaches its limits of travel and the existing seat belt system operates suddenly.

BRIEF DESCRIPTION OF THE DRAWINGS

With the above and additional objects and advantages in view, as will hereinafter appear, this invention comprises the devices, combinations and arrangements of parts hereinafter described, by way of example, and illustrated in the accompanying drawings of a preferred embodiment.

DETAILED DESCRIPTION OF THE DRAWINGS

Figure 1:
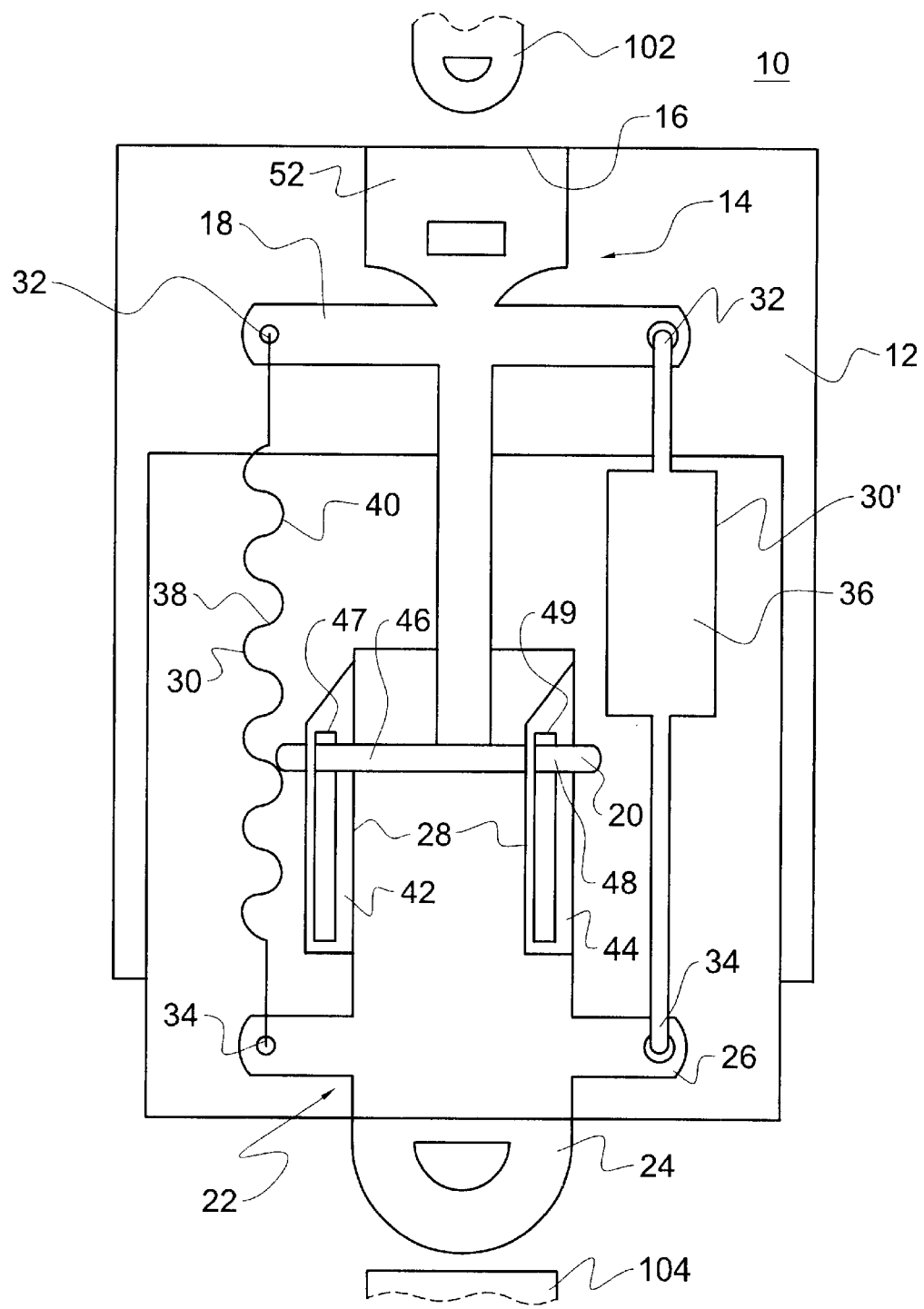
FIG. 1 is a top perspective view of the invention after operation.

Referring to FIG. 1, which shows a top view of the invention after operation. A safety belt restraining device 10 is designed to be attached to an existing vehicle safety belt system 100, shown on FIG. 2, having a male clip 102 and a female buckle 104. The safety belt restraining device 10 includes a body 12 with a female member 14 integrated within the body. The female member 14 has a female end 16, a female base 18 and a hooking member 20. Opposing the female member 14 is a male member 22 integrated within the body. The male member 22 has a male end 24, a male base 26 and a travel member 28. The travel member 28 receives the hooking member 20 and the travel member 28 limits the movement of the female member 14.

Two elastic members 30, 30' are attached between the female base 18 and the male base 16. Each elastic member 30, 30' has a first end 32 and a second end 34. The first end 32 is attached to the female base 18 and the second end 34 is attached to the male base 26. The female end 16 can receive the male clip 102 of the existing safety belt 100 and the male end 24 can be inserted into the female buckle 104 of an existing safety belt 100. The elastic member 30, 30' provides restrained and cushioned movement of the female member 14 during the restraining operation of the existing safety belt 100. The travel member 28 can limit the maximum movement of the female member 14.

The elastic member 30, 30' can also be a damper 36. The damper 36 is filled with a fluid that restrains the movement of a plunger within the damper 36. The damper 36 can be designed where, progressively more force is absorbed by the damper 36 as expansion occurs.

Alternately, the elastic member 30, 30' can be a spring 38. The length of the spring 38, thickness of the wire, number of coils 40 and diameter of the coils 40 can all be varied to provide differing degrees of elasticity to the spring 38. The force of a passenger against the seat belt 100 and the safety belt restraining device 10 is absorbed in the expansion of the spring 38.

There is a spring 38 and a damper 36 shown in FIG. 1. The spring 38 and damper 36 are located on the outside of the hooking member 20 and travel member 28, where they do not interfere with the movement of the hooking member 20 and travel member 28. The spring 38 and damper 36 are attached to the male member 22 at the male base 26 and attached to the female member 14 at the female base 18.

FIG. 1 shows the travel member 28 with a first slotted channel 42 and a second slotted channel 44. The hooking member 20 includes a first wing 46 and a second wing 48. The first slotted channel 42 receives the first wing 46 and the second slotted channel 44 receives the second wing 48 of the hooking member 20. The first slotted channel 42 limits the movement of the first wing 46 and the second slotted channel 44 limits the movement of the second wing 48.

The first wing 46 slides back and forth within the first slotted channel 42. When the safety belt restraining device 10 is in a non-operating state the first wing 46 is positioned within the first slotted channel 42 closer to the male end 24. When the vehicle experiences an impact the safety belt restraining device 10 operates. The first wing 46 of the hooking member 20 begins to slide within the first slotted channel 42 of the travel member 28, from near the male end 24 towards the female end 16. The elastic members 30, 30' begin to extend, limiting the movement of the female member 14. The increasing restraint, provided by the elastic member 30, 30', cushions the jolting impact that occurs to the passenger.

The female member 14 reaches the limits of travel when the first wing 46 reaches the first stop 47 of the first slotted channel 42. Similarly, when the second wing 48 of the hooking member 20 reaches the second stop 49 of the second slotted channel 44, the movement of the elastic members 30, 30' and female member 14 is halted. When the safety belt restraining device 10 and its elastic members 30, 30' have halted movement, the existing vehicle safety belt system 100 is left to absorb and cushion the remaining forces of impact.

Figure 2:
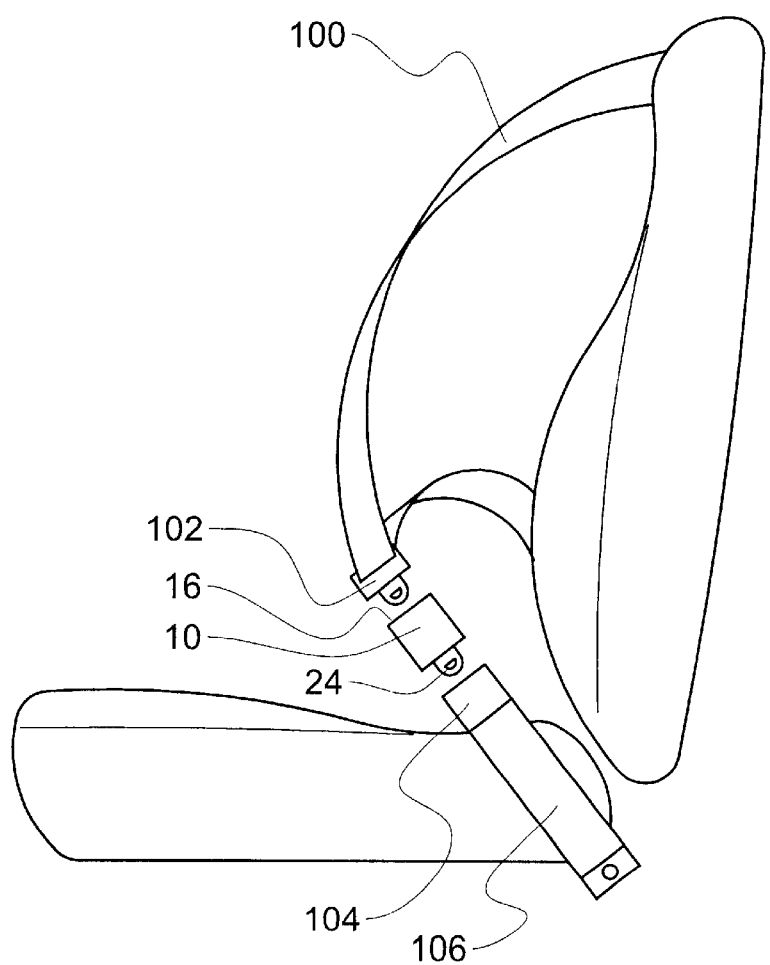
FIG. 2 is a side view of invention attached to the existing seat belt within the interior of a vehicle.

Referring also to FIG. 2., the female end 16 of the invention accepts and attaches to the male clip 102 of an existing safety belt 100. FIG. 2 is a side view of invention attached to the existing seat belt 100 within the interior of a vehicle. The male end 24 can be inserted and attaches to the female buckle 104 of the safety belt. When the existing seat belt 100 and the invention 10 are not in use by the passenger, the safety belt restraining device 10 can be left attached to either the male clip 102 or the female buckle 104 of the existing safety belt 100. When not being used the invention 10 can hang to the side of the vehicle seat, when the female end 16 is attached to the male clip 102 of the existing safety belt 100. Typically the safety belt 100 is attached to the side structure of the vehicle and will recoil away from the sitting area when not in use. Depending on the physical dimensions of the invention, hanging in this area may be the most convenient.

Alternately, the male end 24 of the invention can attach to the female buckle 104 receptacle of the existing safety belt 100. Normally, the female buckle 104 is positioned in the seating area and is secured to the lower frame of the vehicle seat. FIG. 2 shows the female buckle secured by an anchoring strap 106. Having the invention 10 left attached to the female buckle 104 of the existing safety belt 100 leaves the invention 10 resting in the seat area when not being used.

Figure 3:
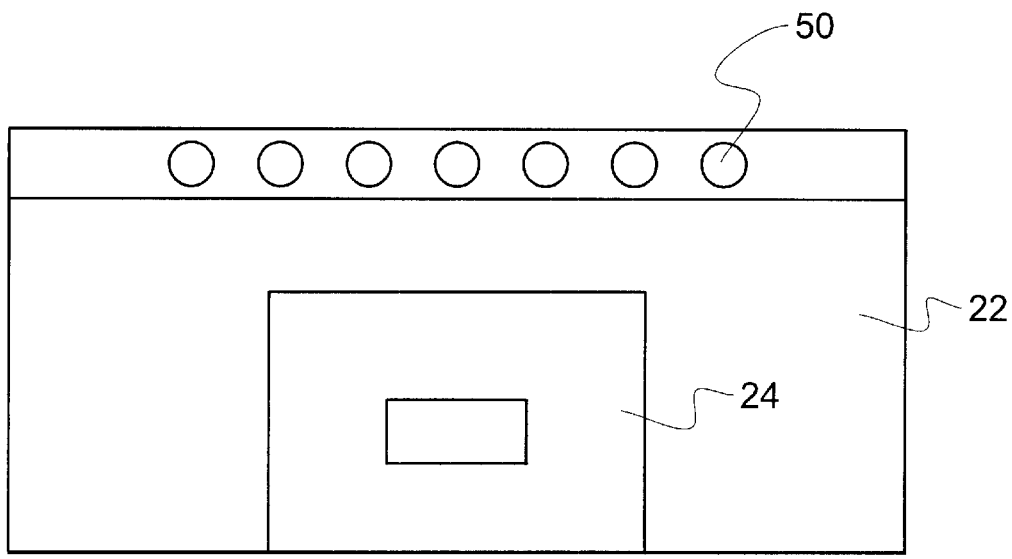
FIG. 3 shows an end view of the male member.

FIG. 3 shows an end view of the male member 22. The safety belt restraining device 10 is illustrated with a light 50 on the male end 24. The light 50 guides the passenger in the placement of the male end 24 of the male member 22 into the female buckle 104 of the existing seat belt 100. Vehicles are often dark or dimly lit, where it can be difficult to find the ends of the seat belt 100 and the invention 10. The light 50 provides an easy identification of the location of the male end 24 of the device. Additionally, the light 50 provides some illumination of surrounding area when the passenger is inserting the male end 24 into the female buckle 104 of the existing seat belt 100. Also, the light 50 can be located on the female end 16 of the invention 10. Different colored lights 50 can be used for identification, when lights 50 are added to both the female end 16 and male end 24.

Figure 4:
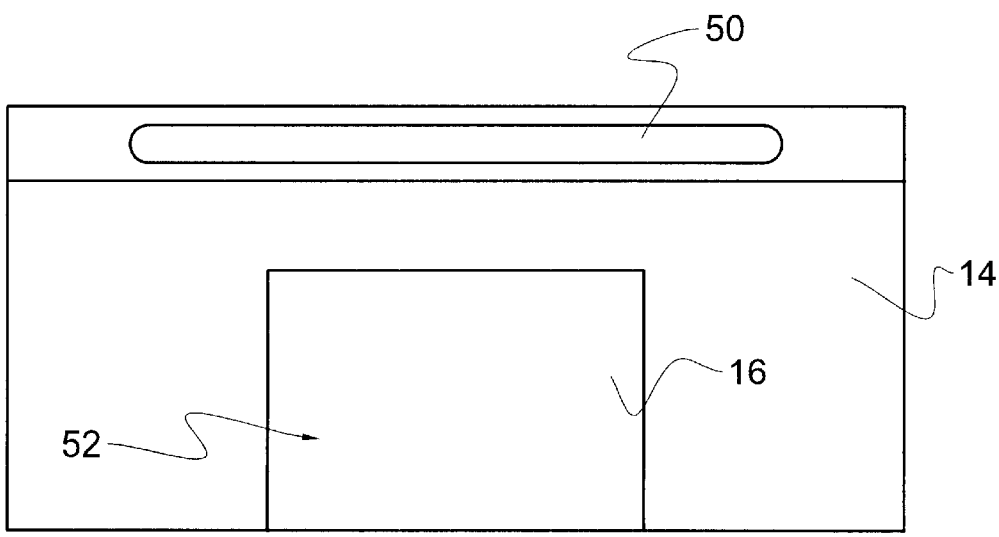
FIG. 4 shows an end view of the female member

FIG. 4 shows an end view of the female member 14. The cavity 52 at the female end 16 receives the male clip 102 of the existing vehicle safety belt system 100. An elongated light 50 is illustrated on the female end 16.

Although the present invention has been described in considerable detail with regard to the preferred versions thereof, other versions are possible. Therefore, the appended claims should not be limited to the descriptions of the preferred versions contained herein.

What is claimed is:

1. A safety belt restraining device designed to be fixedly attached to an existing vehicle safety belt system having a male clip and a female buckle; the safety belt restraining device comprising:
   a) a body;
   b) female member integrated within the body, wherein the female member has a female end, a female base and a hooking member;
   c) a male member integrated within the body, wherein the male member has a male end, a male base and a travel member, and wherein the travel member receives the hooking member so that the travel member limits the movement of the female member; and d) at least two elastic members, wherein each elastic member has a first end and a second end, wherein the first end is attached to the female base and the second end is attached to the male base; and wherein the female end can accept the male clip of the safety belt and the male end can be securely inserted and attached to the female buckle of a safety belt;

wherein one of the elastic members is a spring, wherein the spring provides restrained movement of the female member during the restraining operation of the safety belt, wherein, the travel member has a first slotted channel and a second slotted channel; and the hooking member has a first wing and a second wing, wherein the first slotted channel receives the first wing and the second slotted channel receives the second wing of the hooking member so that the first slotted channel limits the movement of the first wing and the second slotted channel limits the movement of the second wing.

2. The safety belt restraining device of claim 1 wherein the male end includes a light.

3. The safety belt restraining device of claim 2 wherein the female end includes a light.

4. A safety belt restraining device designed to be fixedly attached to an existing vehicle safety belt system having a male clip and a female buckle; the safety belt restraining device comprising:

a) a body;

b) female member integrated within the body, wherein the female member has a female end, a female base and a hooking member;

c) a male member integrated within the body, wherein the male member has a male end, a male base and a travel member, and wherein the travel member receives the hooking member so that the travel member limits the movement of the female member; and d) at least two elastic members, wherein each elastic member has a first end and a second end, wherein the first end is attached to the female base and the second end is attached to the male base; and wherein the female end can accept the male clip of the safety belt and the male end can be securely inserted and attached to the female buckle of a safety belt;

wherein one of the elastic members is a damper, wherein the damper provides restrained movement of the female member during the restraining operation of the safety belt.

5. The safety belt restraining device of claim 6 wherein, a) the travel member has a first slotted channel and a second slotted channel; and b) the hooking member has a first wing and a second wing, wherein the first slotted channel receives the first wing and the second slotted channel receives the second wing of the hooking member so that the first slotted channel limits the movement of the first wing and the second slotted channel limits the movement of the second wing.

6. The safety belt restraining device of claim 5 wherein the male end includes a light.

7. The safety belt restraining device of claim 6 wherein the female end includes a light.

\* \* \* \* \*